US007187922B2

(12) United States Patent
Joffray

(10) Patent No.: US 7,187,922 B2
(45) Date of Patent: Mar. 6, 2007

(54) PROCESS AND DEVICE FOR VALUE ADDED SERVICE ACCESS CONTROL

(75) Inventor: Olivier Joffray, Feucherolles (FR)

(73) Assignee: Axalto SA, Montrouge (FR)

( * ) Notice: Subject to any disclaimer, the term of this patent is extended or adjusted under 35 U.S.C. 154(b) by 72 days.

(21) Appl. No.: 10/492,388

(22) PCT Filed: Oct. 14, 2002

(86) PCT No.: PCT/IB02/04237

§ 371 (c)(1), (2), (4) Date: Apr. 9, 2004

(87) PCT Pub. No.: WO03/034761

PCT Pub. Date: Apr. 24, 2003

(65) Prior Publication Data
US 2004/0259588 A1 Dec. 23, 2004

(30) Foreign Application Priority Data
Oct. 12, 2001 (FR) .................................. 01 13218

(51) Int. Cl.
H04M 3/42 (2006.01)
H04Q 7/20 (2006.01)

(52) U.S. Cl. ............... 455/414.1; 455/3.03; 455/456.3; 704/225; 709/231

(58) Field of Classification Search ............ 455/550.1, 455/405, 435.1, 456–456.1, 432.1, 433, 403, 455/414.1–414.4, 466, 554, 555, 411, 410, 455/418–420; 709/217–225, 249, 231; 380/4, 380/20, 21, 23, 25, 255, 270, 37, 234, 236, 380/237
See application file for complete search history.

(56) References Cited

U.S. PATENT DOCUMENTS

| 5,732,324 | A | * | 3/1998 | Rieger, III | ................. 455/3.01 |
| 5,857,020 | A | * | 1/1999 | Peterson, Jr. | ................. 705/52 |
| 5,987,137 | A | * | 11/1999 | Karppanen et al. | ........... 380/28 |
| 6,195,696 | B1 | * | 2/2001 | Baber et al. | ................. 709/223 |
| 6,236,832 | B1 | * | 5/2001 | Ito | ............................ 455/3.06 |
| 6,317,761 | B1 | * | 11/2001 | Landsman et al. | .......... 715/513 |
| 6,442,598 | B1 | * | 8/2002 | Wright et al. | ............... 709/217 |
| 6,505,160 | B1 | * | 1/2003 | Levy et al. | .................. 704/270 |
| 6,522,875 | B1 | * | 2/2003 | Dowling et al. | ......... 455/414.3 |
| 6,647,417 | B1 | * | 11/2003 | Hunter et al. | ............... 709/225 |
| 6,681,246 | B1 | * | 1/2004 | Dutta | ......................... 709/206 |
| 6,782,253 | B1 | * | 8/2004 | Shteyn et al. | ............. 455/414.1 |
| 6,829,474 | B1 | * | 12/2004 | Adachi | ..................... 455/414.1 |
| 6,845,398 | B1 | * | 1/2005 | Galensky et al. | ........... 709/231 |
| 6,904,264 | B1 | * | 6/2005 | Frantz | ........................ 455/3.04 |
| 6,941,275 | B1 | * | 9/2005 | Swierczek | .................... 705/26 |
| 7,065,342 | B1 | * | 6/2006 | Rolf | ....................... 455/412.1 |

(Continued)

FOREIGN PATENT DOCUMENTS

WO    WO 0065810 A1  * 11/2000

Primary Examiner—Charles N. Appiah
(74) Attorney, Agent, or Firm—Pehr Jansson

(57) ABSTRACT

This application concerns a process for controlling access by a user (7) to a value added service (VAS) (5) received via receiver device (2), designed for connection to a device (3) for transmission of said VAS via network (4). Receiver device (2) receives said VAS (5) from transmitter device (3) in partially enciphered form. Said VAS is transmitted by said transmitter device without any request from user (7). Receiver device (2) receives said VAS (5) from transmitter device (3) in partially enciphered form. This application also applies to the system for implementation of said process.

10 Claims, 3 Drawing Sheets

U.S. PATENT DOCUMENTS

| | | | |
|---|---|---|---|
| 2001/0016834 A1* | 8/2001 | Yamanaka et al. | 705/40 |
| 2002/0061778 A1* | 5/2002 | Acres | 463/40 |
| 2002/0087656 A1* | 7/2002 | Gargiulo et al. | 709/217 |
| 2003/0050991 A1* | 3/2003 | Towell et al. | 709/213 |
| 2003/0065802 A1* | 4/2003 | Vitikainen et al. | 709/231 |
| 2003/0066091 A1* | 4/2003 | Lord et al. | 725/135 |
| 2003/0139180 A1* | 7/2003 | McIntosh et al. | 455/426 |
| 2003/0153330 A1* | 8/2003 | Naghian et al. | 455/456 |
| 2004/0087315 A1* | 5/2004 | Dufva et al. | 455/456.1 |
| 2004/0117500 A1* | 6/2004 | Lindholm et al. | 709/231 |
| 2004/0203581 A1* | 10/2004 | Sharon et al. | 455/406 |
| 2006/0073810 A1* | 4/2006 | Pyhalammi et al. | 455/407 |

* cited by examiner

PROCESS AND DEVICE FOR VALUE ADDED SERVICE ACCESS CONTROL

BACKGROUND OF THE INVENTION

1. Field of the Invention

The invention concerns a process and device for controlling user access to value added services, in particular in the context of mobile telephony or Internet type data packet communication networks.

2. Description of the Related Art

A value added service hereinafter referred to as VAS, is a service for which a charge is frequently made, provided in addition to the services offered by the intermediate medium on which it is distributed. In the context of mobile telephony, the medium is a mobile telephone station. A VAS can be a game, an Internet page interrogation service or the purchase of goods (books, on-line music, etc.) for example. In the context of Internet, the medium is a microcomputer equipped with a browser. VAS examples include interrogation of magazines and software updating.

In the context of mobile telephony, the invention applies to GPRS (General Packet Radio Services), EDGE (Enhanced Data rate for GSM Evolution), UMTS (Universal Mobile Telephone Standard), CDMA 95 and 2000 (Code Division Multiple Access), WCDMA (Wideband CDMA), 3GPP (Third Generation Partnership Program), 3GPP2 (North American version of 3GPP) and other cellular communications networks.

A known current solution for the distribution of value added services in this context is the Internet mobile telephone browser for example.

A number of problems are encountered in connection with access to charged value added services on packet type cellular radiocommunications networks.

To access a VAS, the user must first locate the service. This type of procedure is frequently long, complex and can be unsuccessful if the information available to the user is insufficient. The time required to find the VAS can be billed to the user where access is not free. The user must then access the VAS in question. The user generally attempts to access the service when the network is in most intensive use. Access is consequently lengthy and difficult. The user may even fail to access the services targeted if the telephone network is interrupted. Access to a VAS is consequently costly in terms of both time and money, and users tend to make little call on mobile telephone VAS services.

Moreover, when receiving the VAS, the user has to pay to execute it. He can not know how the VAS works, what the VAS contains, what its functions are, how it is . . . except if he purchases said VAS.

As regards Internet, a solution for restricting access to a site distributing charged information in widespread use involves controlling access to the site by means of an individual password assigned to each user. However, this method is cumbersome and costly. It must involve an access control system which is sufficiently powerful to escape fraudulent misuse, and an associated centralised user entitlement management system. Users have to memorise a number of passwords if they access several sites of this type. Likewise, users must disclose their identity when paying by bank card for the VAS which they wish to access. However, the user may wish to remain anonymous.

In this context, one purpose of this invention is the proposal of a process and device for rapid, easy access to value added services via mobile telephones.

Another purpose of this invention is to propose a process and device enabling an Internet user to avoid the need for memorising passwords to access chargeable information and remain anonymous during said access, and to provide for the creation and simplified maintenance of charged access sites while enhancing the protection of said sites.

SUMMARY OF THE INVENTION

In this context, this invention proposes a process for a user to access to a quantifiable data set received via a receiver device, designed for connection to a transmitter device for said data set via a network, characterised in that said data set is transmitted by said transmitter device without any request from user.

This invention also concerns a system for implementing said process, in particular in the domain of packet type communications networks and mobile telephony.

BRIEF DESCRIPTION OF THE DRAWINGS

Other characteristics and advantages of the invention will become apparent from the following description, provided as an illustrative and non-limitative example of the invention, referring to the appended drawings where.

DESCRIPTION OF THE INVENTION

The invention applies, although not exclusively, to GPRS standard mobile telephone stations. It should be understood however that the invention should not be limited to this single application. Applications can be found, in particular, in connection with other standards such as those indicated above. The invention can also be applied in domains other than that of mobile telephony, including for example that of packet type data communication networks such as Internet and others.

Figure 2:
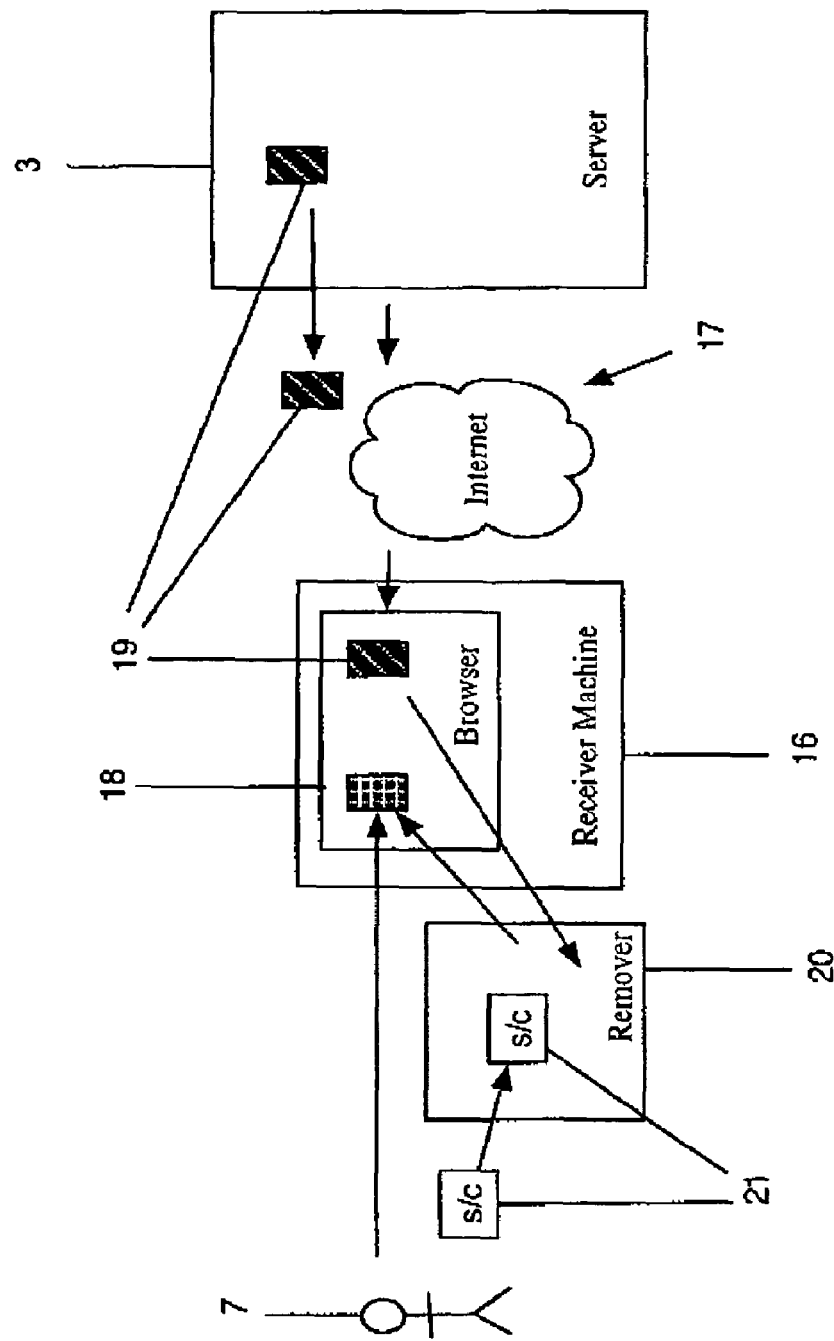
FIG. 2 is a diagram illustrating the principal steps of a practical form of the implementation process for the system according to FIG. 1.
Figure 3:
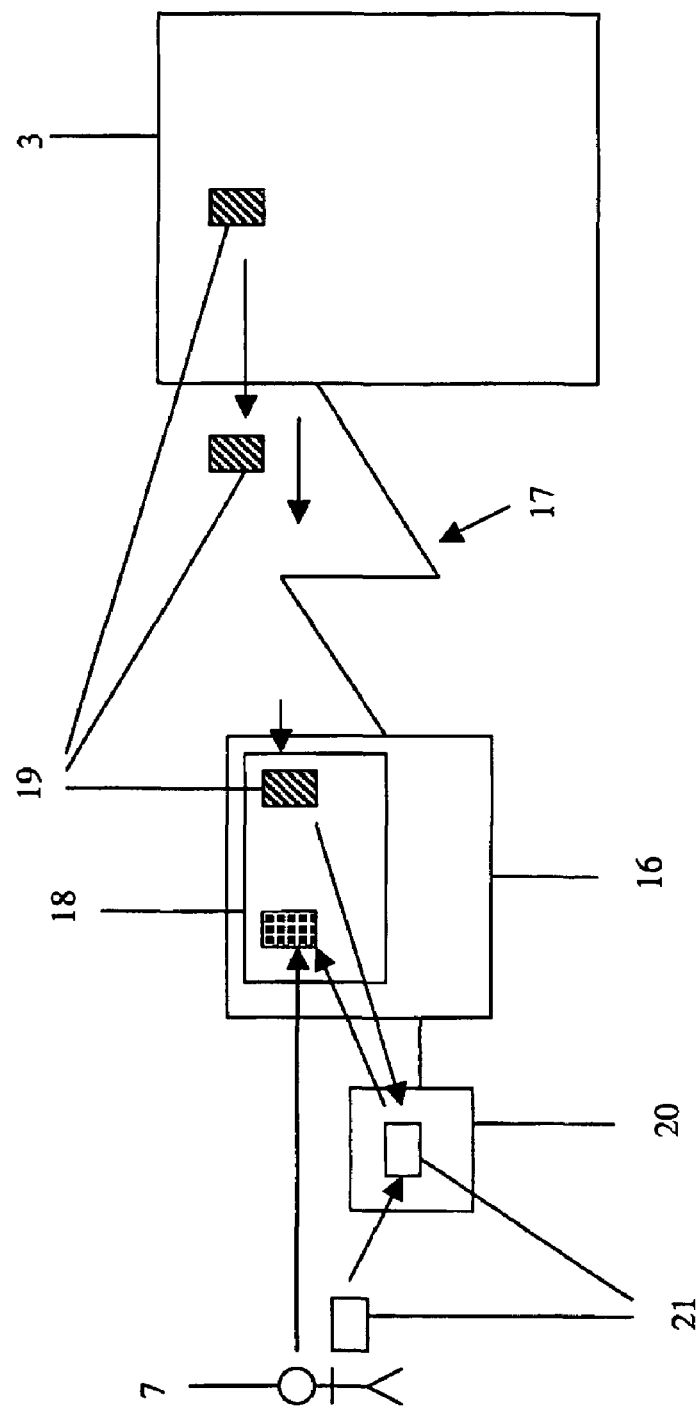
FIG. 3 is a schematic view of a practical form of the system according to the invention in an Internet context.

The invention is described and illustrated below in a first practical form in context of the GPRS network (FIGS. 1 and 2), and a second practical form in the context of the Internet network (FIG. 3).

Figure 1:
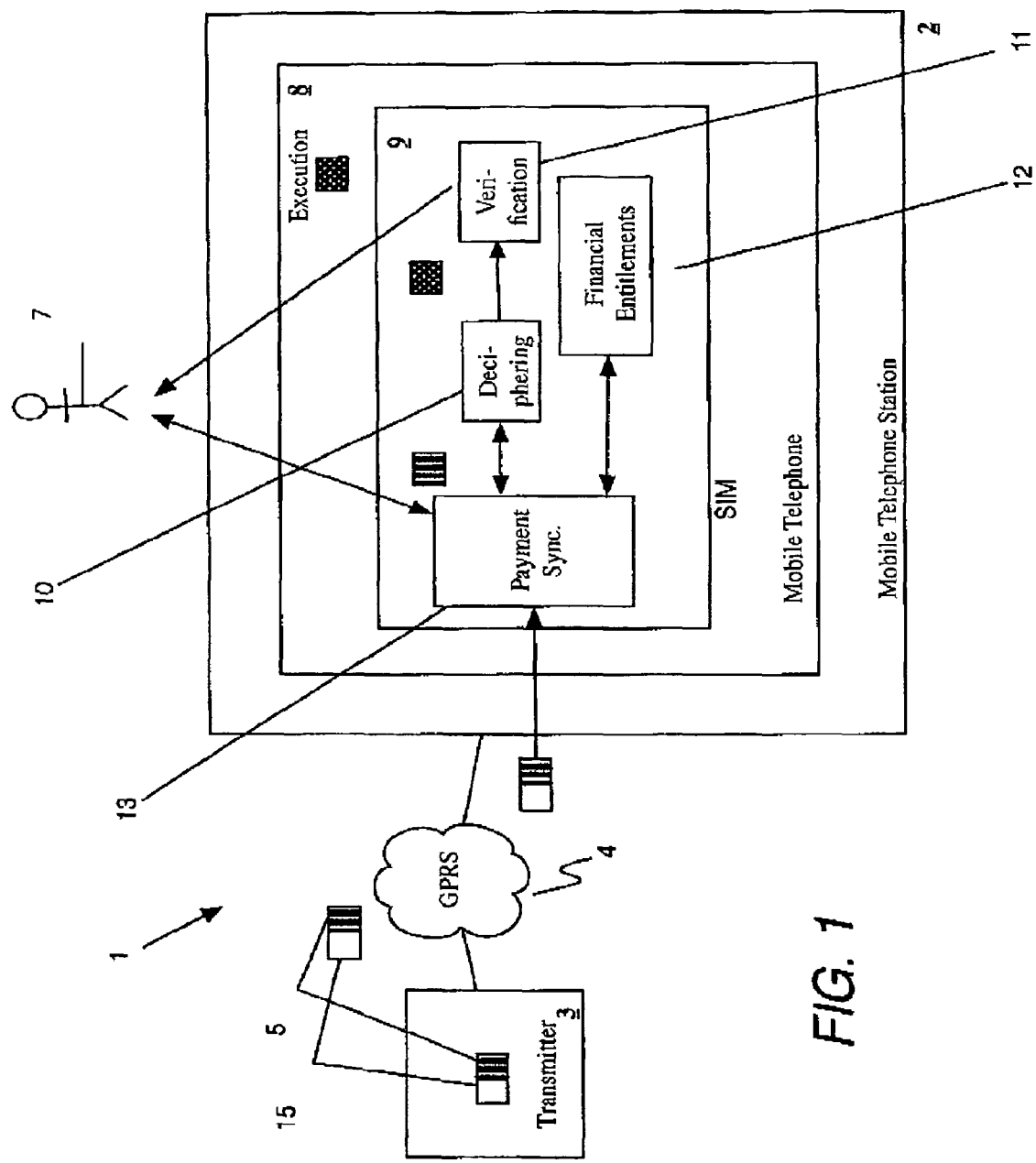
FIG. 1 is a schematic view of one practical form of the system according to the invention, in a mobile telephony context.

The first practical form of this system according to the invention, illustrated in FIGS. 1 and 2, is an application in the mobile telephony domain. System 1 comprises receiver devices 2, namely in the example illustrated, mobile telephone station 2, and transmitter devices 3, namely in the example illustrated service provider 3. Station 2 and provider 3 are connected via a GPRS network 4.

Provider 3 transmits data, and more particular value added services 5, hereinafter referred to as VAS, to station 2. The VAS provided by service provider 3 is transmitted on networks managed by an operator. Transmission of the VAS can be billed by the operator, the amount depending on the number of bytes transmitted and consequently the quality of the service. On the other hand, the number of bytes is of little relevance for billing the VAS by the service provider. The price of a VAS is the price which customers are ready to pay to obtain the service.

Station 2 belongs to and is used by user 7. Mobile telephone station 2 comprises mobile telephone 8 and SIM card 9.

SIM card 9 is a smart card incorporating information processing and storage devices, and a functional module referred to as a Subscriber Identity Module (SIM). The SIM card stores a quantity of data relating to the telephone subscription proper (name of the operator(s) with which the subscription(s) has or have been taken out, type of subscription, subscription identification data, etc.), and also on-board applications. In the particular practical form illustrated in FIG. 1, SIM card 9 incorporates deciphering module 10 enabling said card to decipher messages received by the SIM card. It also incorporates a verification module 11, containing a deciphering verification mechanism such as a checksum. Card 9 incorporates a module 12 containing the financial entitlements of user 7: module 12 can be an electronic purse for example, which can be replenished by means of a bank or other card inserted in an auxiliary reader of telephone 8, or via a secure line with a financial entity capable of downloading a certain sum of money to said electronic purse. Module 12 can also take the form of an adder of amounts consumed by card 9, and billed by period. In another example, module 12 comprises a preloaded counter which is then decremented according to the consumption of user 7. Card 9 incorporates module 13 for synchronisation of payment for a VAS and deciphering of this service.

In the following description, the term subscriber card is used to indicate a card providing the functions of an SIM card presented above. A subscriber card can consequently also be a USIM card. It should be noted that modules 10, 11, 12 and/or 13 can be integrated in telephone 8, or in another unit such a machine capable of communicating with telephone 8. The term machine corresponds to a very broad conceptual unit, combining hardware and software (computer, smart card, etc.).

The process for controlling access to VAS 5 transmitted to station 2 via GPRS network 4 is illustrated in FIGS. 1 and 2, and is executed as follows.

In a first step, service provider 3 takes advantage of an off-peak period of during the day or at night, during which the network is underemployed, to transmit a VAS 5 to one or more mobile telephone stations 2. In this way, user 7 does not have to connect and pay for the time required to find said VAS. The VAS is transmitted by provider 3 without the user having to take any action. Transmission of the VAS is billed to provider 3 in whatsoever manner and not to the user. The provider downloads said VAS to station 2 without the user being informed. As the supplier uses off-peak periods to transmit VAS services, the rate for transmission of these services can be negotiated with the operator, so that this special utilisation improves amortisation of its network. Furthermore, as the network is underemployed, the provider is certain that the VAS is transmitted rapidly to target stations 2.

Taking an illustrative example, provider 3 is a music distributor. A new song is published, and the provider wishes to distribute the song for the purpose of advertising and selling the song. According to the invention, the provider communicates the song to a given number of users 7 or all stations 2 able to intercept it, during off-peak hours.

Provider 3 transmits VAS 5 in a protected mode so that the user cannot use the service on its reception by station 2. The user cannot use VAS 5 as long as access to the service is protected.

Advantageously, provider 3 transmits additional data 15 in addition to VAS 5. Additional data 15 comprise indications for card 9 or telephone 8 for transmitting the deciphering key and/or information for calculation of this key, reading the protected VAS and indicating the price of the deciphering key, and allow its authentication. Additional data 15 are as follows in particular:

format in which the data are transmitted, for example XML (Extensible Markup Language), BER (Basic Encoding Rule) or DER (Distinguished Encoding Rule) format;

or the deciphering key protected by a key known to card 9, information enabling card 9 to calculate the deciphering key, or a combination of the two;

signed price of the deciphering key;

certificate for verification of the price signature.

In this way it is not necessary for the data format to be known to the card or telephone.

According to the practical form illustrated in FIG. 1, VAS 5 is protected by enciphering. Provider 3 enciphers part or all of the VAS before it is transmitted. The provider in the example illustrated enciphers the most important data of the VAS. With the data enciphered, user 7 cannot access VAS 5 transmitted. Enciphering is performed using a cryptographic process. Deciphering requires possession of a device for deciphering the VAS, namely a key or equivalent device, hereinafter referred to as the deciphering key. Without the key, the user cannot decipher the VAS.

In the example concerning a music distributor, the distributor partly enciphers the song so that the user can listen to part for advertising purposes, but cannot listen to the complete song without paying.

A VAS transmitted comprises a single block, or a block which can be broken down into a number of separate parts. Each part of the VAS is protected separately, and certain parts can be left unprotected. If part of the VAS is not protected, it can be accessed directly by the station without the need for a key.

According to another specific form, the VAS comprises a number of independent parts. For example, the VAS comprises multimedia data, such as photos, videos and music. This type of data can be segmented, providing separate access to one part or another. Photos are displayed one after the other, pieces of music listened to separately, and videos made up of a number of sections.

According to another advantageous practical form, VAS 5 transmitted by provider 3 comprises a number of parts arranged in such a way that each part contains the following elements: the first part contains the second, the second contains the third, etc. In this way, the price increases according to the level of service desired by the user. As indicated above for example, the first part can be freely accessible without the need to purchase a key. The next part comprises a demonstration of the VAS, designed to encourage the user to purchase the complete VAS. The second part of the VAS is charged, but costs less than the third part as being of lesser interest. By purchasing the third part, the user obtains access to the first, second and third parts of the VAS. Purchase of a key to access part of the VAS provides access to all the other parts containing the VAS.

In a second step (FIGS. 1 and 2), VAS 5 is received by station 2 in partially or fully enciphered form. Telephone 8 or card 9 informs the user of reception and the purpose of a VAS, on the mobile telephone screen. If the VAS is partially enciphered, telephone 8 or card 9 proposes execution of the uncoded part to the user for demonstration purposes (to show how the VAS is working without being able to use it), for presentation purposes (to inform the user on its content and functions, as for example a table of contents of a newspaper), for showing an extract or for other purposes. In the example of the music distributor, telephone 8 or card 9 invites the user to listen to part of a song, the title, singer and release date of which are indicated. The provider decides what information to provide for the user. It allows the user to have an idea (a demonstration, a presentation, an extract or else) of the VAS before purchasing it.

If the user decides to access the VAS received, he must purchase an appropriate deciphering key. The price of the key corresponds to the price of the VAS. The price of the key can also include other expenses as will be seen below. The price can be indicated, signed, in data 15 as indicated above. Card 9 verifies the signature and extracts the price. Card 9 can also request the price from a given entity of network 4. The price and certificate are then not included in data 15.

Protection of said parts is obtained either by means of a single key, or by a number of keys with a different key per part for example.

According to a first practical form of the deciphering key, there is one key or a set of single keys per user or group of users, enciphering of the VAS differing according to said key or said set of keys. Each user or group of users has their own key, which differs from the deciphering keys of the other users. Thus the same VAS is transmitted in a number of different forms corresponding to the number of users or user groups. Users in the same group receive the same data set representing the enciphered VAS, using a key or set of identical keys for the complete group.

According to a second practical form of the key, one key or one set of keys is provided for all users wishing to access the VAS. The enciphered VAS is identical irrespective of the user to which it is transmitted.

According to a third practical form, in which the VAS comprises a set of parts having a logical link between the parts (such as a video sequence of one hour sub-divided into two-minute sections, the sections being chained logically), each part is enciphered with a different key. Enciphering of a VAS requires a set of keys.

This third practical form is applicable to a VAS comprising a set of parts so arranged that each part contains the other parts (as described above). A different key is provided for each of said parts. A different price is associated with each key. In this way and as indicated above, the price of the required data varies according to their level, and corresponds to the price of the key used to decipher said data.

To avoid the need for a set of keys, the invention proposes the derivation of a given key into a number of different keys, so as to have the same number of keys as the number of sections. The keys are deduced from one and the same key, and are also deduced from each other. Thus, by deriving given key Kn, a first key with order Kn-1 is obtained. By deriving key Kn-1, a key with order Kn-2 is obtained. The three keys can then be used to decipher a three-section VAS. Keys with order n-1 and n-2 are obtained from a single key Kn. The key with order n-2 is obtained from the key with order n-1.

Likewise, a key with a given order is used to calculate all keys of lower order, and consequently to decipher all lower order sections (namely all sections to be viewed before the section with the order in question). A key with a given order can therefore be used, in the case of a video sequence, to view the sequence up to the section of said order, said section included. On the other hand, the key of said order cannot be used to calculate keys of higher order, or to decipher sections to be viewed later in the sequence.

The derivation process is transmitted in additional data 15.

According to a special practical form, deciphering and purchase of the key are made indissociable by means of card 9. Card 9 obtains the deciphering key from data 15 received, and only allows deciphering of the VAS with said key after verification of user payment. The VAS can only be deciphered when payment for said key has been made.

Payment by the user of the VAS of the key price indicated in data 15 or communicated by a given entity, is performed in various known ways, on-line or off-line (immediate or deferred). According to a first example of immediate off-line payment, card 9 has an electronic purse 12. If the user wishes to access the Reporting income statement AS received, he indicates this to card 9 by pressing a corresponding key on the keyboard of telephone 8. Card 9 withdraws the amount required for purchase of the key in question from the electronic purse. User 9 replenishes said purse either using a bank or other card inserted in an auxiliary reader of telephone 8, or using a secure link with a financial entity able to download a certain sum of money to said electronic purse. According to a second example of immediate on-line payment, said sum required is debited to a user account with the operator or a financial entity. The debit operation is transmitted via a secure link to the corresponding party. According to a third example of deferred on-line payment, said requisite sum is recorded by an adder on the card. The adder sums the amounts spent by station 2 and stores the total. The total is debited to an account via a secure line at a later date.

If the user pays the provider on line, the operator must also be paid for transmission of payment data (in addition to transmission of the VAS). In addition, if execution of the VAS requires access to the telephone network, the operator must also be paid for utilisation of the network by the VAS. The price of the key, according to a specific practical form, is the sum of the price of the VAS proper plus various expenses such as transmission of the VAS to station 2 (if the user requests access to the VAS), transmission of payment data (in the case of on-line payment), utilisation of the network for execution of the VAS, etc. In the case of multimedia data, the charge can vary according to the quality of service desired by the user. For example, a photo can be displayed in various formats (mini, telephone screen size, giant size for storage by a computer). Agreements are established between operator and access provider in regard to billing said user. Numerous possibilities are available but are not examined in connection with this application. According to an agreement example, the provider concludes an agreement with the operator under the terms of which transmission of the VAS, the VAS proper, transmission of VAS payment and all other expenses are paid by the user to the operator. The operator undertakes to pay the corresponding sum to VAS provider 3.

When the payment is made or accounted, card 9 deciphers the VAS. A number of deciphering solutions are possible, including the following in particular.

According to a first solution, additional data 15 include information enabling the cryptographic module of card 9 (or telephone 8) to calculate a VAS deciphering key. The module calculates the key, deciphers the VAS using the key calculated, and executes the VAS.

According to a second solution, the cryptographic module contains an intermediate key K2, used to decipher another key K1 (deciphering key) transmitted in data 15. The module deciphers deciphering key K1 received using intermediate key K2 at its disposal. Card 9 then deciphers VAS 5 using deciphering key K1 received and deciphered by K2.

The VAS can also be deciphered by the mobile telephone, which receives the deciphering key from card 9.

The keys or key calculation information transmitted to station 2 for the solutions described above, can be received from an entity other than provider 3 and subsequent to transmission of VAS 5.

As has already been seen in the example illustrated in FIG. 1, card 9 contains the deciphering key and payment mechanism for said key, and only makes the key accessible when user payment has been made.

Other options are available. If station 2 is a twin card reader telephone, the card 9 containing the key and/or payment mechanism is a card inserted in the auxiliary reader of station 2.

Likewise the key and/or payment mechanism can also be held by telephone 8. For example, the key can be stored in the card and the cryptographic module (deciphering module) in telephone 8.

When deciphering has been completed, module 11 in the card or telephone verifies the deciphering operation.

For operational purposes, mechanism 13 is provided for synchronisation of payment and delivery of the key. It should be noted that purchase of the key can occur before, during or after reception of the VAS.

As is demonstrated by the second practical form of the system according to the invention in an Internet context, as illustrated in FIG. 3, the system includes a receiver device, namely machine 16. The system also includes transmitter device 3, this being an Internet access provider, and more precisely server 3 in the example illustrated. Server 3 and machine 16 are interconnected by a packet type data communication network 17 such as Internet.

Machine 16 is used by user 7, and incorporates browser 18 for display of pages 19 communicated by server 3. Reader 20 for smart card 21 is connected to machine 16.

The VAS access control process transmitted by machine 16 via Internet network 17 and illustrated in FIG. 3 is executed as follows. XXXXXX The process involves leaving free access to enciphered Internet pages 19. No password is required to access a given page. However, if the page involves charged access, it is enciphered and consequently unusable by the user having downloaded the page.

According to a second step, access provider 3 for a page, and more precisely server 3 for the page concerned, transmits said page to machine 16 in enciphered form. All the mobile telephone application principles described above are also valid for the Internet application, including the following principles in particular. Machine user 7 cannot interrogate pages received from the server until the deciphering key for said pages has been purchased.

The user pays for the key with smart card 21 which is inserted in reader 20. According to the practical form of the process whereby the purchase of a key and the deciphering function are made indissociable, the card incorporates a cryptographic module 10 which is used to decipher said pages only when payment has been made by the user using mechanism 12 incorporated in said card (electronic purse, adder, counter, secure line communication module, etc.), whether payment is immediate or deferred. Module 11 verifies deciphering.

According to a variant, card 21 stores the deciphering card(s). Deciphering is performed using the key or keys stored by the machine. A card only transmits the key or keys to the machine when payment has been made.

The payment mechanism, cryptographic module and verification module can also be integrated in machine 16 or any other element.

This application concerns a process for controlling access by a user 7 to a quantifiable data set 5, 19 received via a receiver device 2, 16, connected to device 3 transmitting said data set via network 4, 17, characterised in that receiver device 2, 16 receives said data set 5, 19 from transmitter device 3 in a partially enciphered form, and that said receiver device 2, 16 deciphers said data set by means of a deciphering key which it must purchase.

The deciphering function and purchase of the key are made indissociable by means of a smart card used by the receiver device; so as to allow deciphering of said data set only when payment for said key has been made.

Purchase and acquisition of the key are dissociated from reception of said data set.

Said data set received is segmented into a number of parts, each part being encipherable independently from the others, with certain parts not necessarily enciphered. According to a particular practical form, said data set comprises a number of parts arranged so that each part contains the following parts.

According to a first variant, one key or a set of unique keys for each user or user group of said data set is provided, deciphering of said data set differing according to said key.

According to a second variant, a single key or single set of keys is provided for all users wishing to access said data set.

Said data set is transmitted by said transmitter device during an off-peak period of network 4, and without any request from user 7.

Said data set contains at least following additional data 15:
data transmission format such as XML (Extensible Markup Language), BER (Basic Encoding Rule), or DER (Distinguished Encoding Rule) format for example;
deciphering key protected by a key known to card 9, information enabling card 9 to calculate the deciphering key, or a combination of the two;
signed price of the deciphering key;
certificate for verification of the price signature;
deciphering key derivation process.

The deciphering key is obtained from information received by the receiver device for calculation of said key, or by deciphering a protected deciphering key received by the receiving device, by an intermediate key held by said receiver device.

This application also concerns an on-board system designed for installation in a mobile telephone station 2, comprising data processing and storage devices, characterised in that the system incorporates devices by means of which a deciphering key for a quantifiable protected data set received by station 2 is only delivered when the user of said station has paid for said deciphering key.

This application concerns a mobile telephone incorporating an on-board system reader, designed to receive an on-board system 9 comprising information processing and storage devices, characterised in that it incorporates a device for deciphering a quantifiable protected data set received by the telephone by means of a deciphering key, only when the user of said telephone has paid for said deciphering key.

This application concerns a machine accessed by a user 7, and designed for connection to transmitters via packet type communication network 17, characterised in that it incorporates a device only allowing access to a quantifiable protected data set when user 7 has paid the price of the deciphering key for said data set.

This application concerns an enciphering/deciphering process for a quantifiable data set segmented into a number of parts, designed for transmission by a transmitter device to a receiver device via a data communication network, characterised in that it involves derivation of a key into a number of different keys, and deciphering of each segment of each data set by one of said original or derived keys, in such a way that all deciphering keys are deduced from a single key.

So, the present invention concerns a method for controlling of access by a user 7 to a quantifiable data set 5, 19 received via a receiver device 2, 16, designed for connection to a transmitter device 3 for said data set via a network 4, 17, characterised in that receiver device 2, 16 receives said data set 5, 19 from transmitter 3 in at least partially enciphered form, and that said receiver device 2, 16 deciphers said data set by means of a deciphering key which user 7 must purchase.

The present invention concerns also a method for a user 7 to access to a quantifiable data set 5, 19 received via a receiver device 2, 16, designed for connection to a transmitter device 3 for said data set via a network 4, 17, characterised in that said data set is transmitted by said transmitter device without any request from user 7. Said data set is transmitted by said transmitter device during an off-peak period for network 4

Said data set received is segmented into a number of parts, it being possible to encipher the parts independently from each other, with certain parts not necessarily enciphered. Said data set comprises a number of parts arranged in such a way that each part contains the following parts.

One key or a set of unique keys for each user or group of users of said data set is provided, deciphering of said data set differing according to said key.

According to another embodiment, a single key or single set of keys is provided for all users wishing to access said data set.

The process involves derivation of one key into a number of different keys, and deciphering of each segment of said data set with one of said original or derived keys, in such a way that all deciphering keys are deduced from a single key.

The deciphering key is obtained from information received by the receiver device for calculation of said key, or deciphering of a protected deciphering key received by the receiver device by an intermediate key held by said receiver devices.

Although specific embodiments of the invention have been described and illustrated, the invention is not to be limited to the specific forms or arrangements of parts so descried and illustrated. The invention is limited only by the claims.

The invention claimed is:

1. A process for a user (7) to access to a value added service (VAS) (5,19) received via a receiver device (2,16), designed for connection to a transmitter device (3) for said VAS via a network (4,17), comprising;
   - transmitting, said VAS by said transmitter device without any request from the user (7); and
   - informing the user of reception of said VAS and proposing to the user execution of an uncoded part, said VAS being transmitted in a partially enciphered form.

2. The process according to claim 1, wherein said VAS is transmitted by said transmitter device during an off-peak period for network (4).

3. The process according to claim 1 or 2 of the preceding claims, wherein said VAS is downloaded to the receiver device without the user being informed.

4. The process according to claim 3, wherein said receiver device (2,16) receives said VAS (5,19) from transmitter (3) in at least partially enciphered form, and said receiver device (2,16) deciphers said VAS by means of a deciphering key which user (7) must purchase.

5. The process according to claim 1 or 2, wherein said receiver device (2,16) receives said VAS (5,19) from transmitter (3) in at least partially enciphered form, and said receiver device (2,16) deciphers said VAS by means of a deciphering key which user (7) must purchase.

6. The process according to claim 1, wherein said VAS is downloaded to the receiver device without the user being informed.

7. The process according to claim 6, wherein said receiver device (2,16) receives said VAS (5,19) from transmitter (3) in at least partially enciphered form, and said receiver device (2,16) deciphers said VAS by means of a deciphering key which user (7) must purchase.

8. The process according to claim 1, wherein said receiver device (2,16) receives said VAS (5,19) from transmitter (3) in at least partially enciphered form, and said receiver device (2,16) deciphers said VAS by means of a deciphering key which user (7) must purchase.

9. A mobile telephone incorporating a user interface information processing and storage devices, a plurality of devices which inform, through the user interface, the user of reception of a value added service (VAS) received without any request from the user, said storage devices storing the received value added service (VAS), and further comprising devices which propose to the user execution of an uncoded part, and wherein said VAS is being transmitted in a partially enciphered form.

10. A machine accessed by a user (7) and designed for connection to transmitter devices via a network, comprising;
   - devices which inform the user of reception of a value added service (VAS) received without any request from the user; and
   - devices which propose to the user execution of an uncoded part, wherein said VAS is transmitted in a partially enciphered form.

* * * * *